Figure 1:
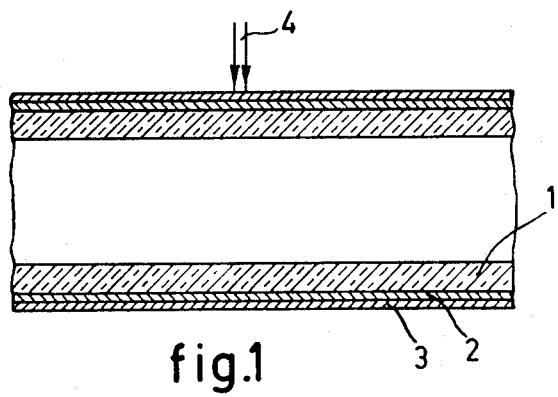

United States Patent

[11] 3,620,958

[72] Inventors Popko Reinder Dijksterhuis;
Robert Rust, both of Emmasingel,
Eindhoven, Netherlands
[21] Appl. No. 861,974
[22] Filed Sept. 29, 1969
[45] Patented Nov. 16, 1971
[73] Assignee U. S. Philips Corporation
New York, N.Y.
[32] Priority Sept. 30, 1968
[33] Netherlands
[31] 6813995

[54] DEVICE FOR ELECTROPHORETIC ANALYSIS USING A CAPILLARY TUBE WITH DETECTION MEANS
15 Claims, 7 Drawing Figs.

[52] U.S. Cl. ................................................ 204/299,
204/180 R, 204/1 T
[51] Int. Cl. ................................................ B01k 5/00,
B01d 13/02

[50] Field of Search ............................................ 204/180 R,
180 G, 299, 1 T

[56] References Cited
UNITED STATES PATENTS
2,412,602  12/1946  Chambers et al. ............  88/14
2,711,379  6/1955   Rothstein ......................  148/1.5
2,989,457  6/1961   Van Oss et al. ...............  204/299
3,025,224  3/1962   Kepes ............................  204/1
3,453,200  7/1969   Allington ......................  204/301
3,492,396  1/1970   Dalton et al. .................  424/12

Primary Examiner—John H. Mack
Assistant Examiner—A. C. Prescott
Attorney—Frank R. Trifari ABSTRACT: Cathode and anode containers are connected by a capillary measuring tube which has a detection electrode formed by a photoconducting material on or in the capillary measuring tube.

SHEET 2 OF 2

INVENTORS
POPKO R. DIJKSTERHUIS
ROBERT RUST
BY

AGENT

DEVICE FOR ELECTROPHORETIC ANALYSIS USING A CAPILLARY TUBE WITH DETECTION MEANS

The invention relates to a device for and a method of separating and analyzing mixtures of substances by means of displacement electrophoresis, and particularly to detection methods used therefore.

Electrophoresis is a known phenomenon in electrochemistry and relates to the motion of charged particles under the influence of an electric field mostly in a liquid medium. The charged particles may either be dissolved or suspended in the liquid medium, and may be, for example, ions of strong and weak electrolytes macromolecules, such as proteins or charged colloidal particles.

Displacement electrophoresis is to be understood to mean electrophoresis in which the substances to be separated (in a solution or suspension) are caused to move, under the influence of an electric field, in a tube filled with an electrically conducting liquid, the different charged particles being displaced at different velocities due to differences in their mobility and thus being separated in zones, each zone comprising particles of the same mobility. The mobility may be expressed in $cm.^2/volt$ sec. and indicates the mean velocity of a charged particle in cm. per second at a voltage drop of 1 volt per cm.

In the present invention the solution to be examined (analyzed) comprises salts having different anions and a common cation. Their further description in principle also applies to cases in which a solution to be examined (analyzed) comprises salts having different cations and a common anion or, for example, colloidal particles having a similar charge. Likewise the same applies in principle to cases in which a sample to be examined comprises different anions and different cations; in that case the sample is introduced into the center of the capillary measuring tube.

A device for performing displacement electrophoresis comprises a capillary tube (hereinafter also called capillary measuring tube) the ends of which are connected to containers. An electrode is provided in each container. The containers are denoted cathode container and anode container. An anode solution (anolyte) is brought into the anode container, a cathode solution (catolyte) is brought into the cathode container. For the first-mentioned case the measuring tube is entirely filled with anolyte. The composition of the anolyte is chosen to be such that the anions present therein are more mobile — that is to say, they move at a greater velocity in the electric field applied between cathode and anode — than the anions in the solution to be analyzed. The cathode container is filled with a solution of an acid the anions of which are less mobile than those of the mixture to be examined. The device includes means to introduce samples of a mixture to be analyzed into the capillary tube in such a manner that it is brought between anolyte and catolyte and that the sharpest possible limits are formed with these solutions.

A voltage is applied between cathode and anode, which voltage is preferably controlled during analysis such that a constant current flows between the electrodes. As a result the anions in the system and hence also those in the sample to be analyzed move towards the anode at different velocities. Due to the differences in mobility, a separation occurs between more mobile and less mobile anions with the result that zones are formed such that one zone only comprises anions of the same mobility. These zones are further referred to as anion zones.

When the separation in anion zones has been completed, electrical voltage gradients have adjusted in the different zones, which gradients are inversely proportional to the mobilities of the anions in the different zones. As a result the different anion zones are forced to move at the same (and constant) velocity. The separation of the zones is maintained by means of self-correction of the fronts. If an anion would diffuse into a zone where the potential gradient is smaller than that corresponding to its mobility, the velocity of this anion will decrease. If an anion would diffuse into a zone where the voltage gradient is larger than that corresponding to its mobility, the velocity of the ion will increase until it is again in its own zone.

Thus, the different anions in the sample to be analyzed are separated in this manner with regard to their mobility — anions having the same mobility are in the same zone.

In the condition of the separation into zones having become complete, the differences in electrical voltage gradients of the zones are determined by the mobility of the anions which are present in these zones; the length of the zone is determined by the concentration of the anions. By measuring these magnitudes for each zone, the nature and concentration of the anions in the sample to be analyzed can be determined — after calibration of the temperature.

A method of and a device for separating mixtures of substances by means of displacement electrophoresis employing potential measurements has already been described; the variations in the potential gradient along the capillary measuring tube are used as a means for detection. In this case an embodiment of the method has been chosen in which the capillary has the shape of a flat tube and in which the anode liquid is moving in a counterflow to the zones, the counterflow being adjusted in such a manner that the zones substantially are not displaced in the capillary. In this method, the potential is measured (detected) with the aid of electrodes which are provided in the wall of the capillary so that they are in contact with the liquid contained therein. For this embodiment it is necessary to provide a number of such electrodes slightly spaced apart. This has the drawback that the capillary must be provided with a large number of electrodes. The manufacture of such a capillary provided with the required electrodes requires intricate and time-consuming technical operations.

For practical use of displacement electrophoresis as a method of analysis, it should be possible to perform a large number of analyses in series in a simple manner. To this end it is required that it must be possible for the capillary measuring tube to be either cleaned in a simple and quick manner or be discarded and replaced by a new one. None of these condition is fulfilled in the said known apparatus. Cleaning of the capillary — by rinsing with the anode liquid — is a cumbersome and time-consuming operation. The use of a new capillary provided with the required electrodes for each analysis is economically very little attractive.

The said known apparatus has still another drawback. Since electrodes are provided in the wall of the capillary measuring tube, which electrodes contact the liquid contained in the capillary, irregularities are present on the inner surface of the capillary. These cause the separation between the different zones to be more or less disturbed.

An embodiment of a method of and a device for analyzing mixtures of substances by means of displacement electrophoresis has also been proposed, in which the detection does not consist in measuring voltage gradients, but is effected in a different manner with the aid of detectors provided on the outer side of a capillary measuring tube. The detection method used in this case is based on the following recognition.

Heat is developed in the capillary measuring tube due to the passage of current. Since the quantity of developed heat is proportional to the potential gradient it will differ from zone-to-zone. If the heat capacity of the capillary measuring tube is small, the temperature of the tube will be locally proportional to the speed at which heat is developed and the temperature of the tube will be a stepfunction if it is plotted along the length of the capillary, a step in the temperature occuring at the transition between two zones. In this known method the occurring temperature differences along the capillary measuring tube are used as a means for detection. To this end one or more thermocouples have been secured to the capillary measuring tube, which couples are connected to a recorder (signal amplification and recording device) which record the EMF differences produced in a thermocouple and occurring when the different zones pass this couple. When using two thermocouples provided at a short distance from each other, the differences in temperature along a short piece of the measuring capillary can be determined. In this differential measuring method the recorder shows a curve which gives the first differential coefficient of the said step function; the peaks in the curves indicate the lengths of the zones, the difference in surface below two peaks is a measure of the difference in mobility of the anions in the zones associated with the peaks.

In this known method the measuring capillary must be present in a room the temperature of which can accurately be set and checked. Furthermore, it has been found that for use of this method a comparatively large quantity of the sample to be analyzed is required, because the detection method employed is only suitable if the length of each zone is at least a few mms. Furthermore the thermocouples must be secured very carefully to the capillary measuring tube. This implies that the thermocouples cannot be moved along the capillary measuring tube during an analysis. The thermocouples will have to be provided at such a distance from the place where the sample is introduced in the capillary measuring tube that it is ensured that a complete separation into zones has taken place when these zones pass the thermocouples. Also on account of this an analysis requires much time.

For series analyses similar drawbacks as those described in the description of the first-mentioned known method are experienced in this method due to those factors.

The invention relates to a device for and a method of separating and analyzing mixtures of substances by means of displacement electrophoresis, in which the drawbacks of the known methods and devices are obviated and which is eminently suitable for performing series analyses.

The invention relates to a method of separating and analyzing mixtures of substances by means of displacement electrophoresis, in which an electric current flows through the liquid electrolyte in the capillary measuring tube under the influence of an electric field between a cathode and an anode provided containers which comprise a liquid catolyte and liquid anolyte, respectively, and which containers are connected by a capillary measuring tube filled with a liquid electrolyte, a solution or suspension of the substances to be separated or analyzed being introduced into the capillary measuring tube, the said substances being moved in the longitudinal direction of the capillary measuring tube under the influence of the electric field, and being separated into zones until each zone comprises one of the substances, variations in the potential gradient along the capillary measuring tube being used as a means for detection, the invention being characterized in that the detection is performed with electric detection means provided on or in the capillary measuring tube, that a detection electrode provided on or in the capillary measuring tube is formed by a photoconducting material, that means are provided to expose the photoconducting material in the area or areas of the capillary measuring tube where the potential shall be measured, that means are provided to electrically connect the exposed part of the photoconducting material which has become electrically conducting to a recorder (signal amplification and recording device).

The invention also relates to a device for carrying out this method.

The exposed part of the photoconducting material forms the connecting element between the means which connects this part electrically to the recorder and, directly or indirectly, in the latter case through the wall of the capillary measuring tube the electrolyte in the capillary measuring tube.

The capillary measuring tube may have different forms. The wall of the measuring tube preferably consists of a material the specific electric resistance of which lies between $10^6$ and $10^{12}$ ohm cm., but it may alternatively be higher, namely $10^{12}$–$10^{15}$ ohm cm. The latter applies especially in case of a small wall thickness. Suitable for this purpose are materials such as glass, glass ceramic, plastic material, rubber, for example, polyurethane, ceramic material, and, for example, electron conducting glasses, which have a specific resistance of $10^7$–$10^{12}$ ohm cm. at room temperature according to U.S. Pat. Spec. No. 3,307,929.

The form of the capillary measuring tube may either be such that the photoconducting material does not contact the electrolyte in the capillary measuring tube, or it may be such that it does contact the electrolyte.

In the first case the photoconducting material may suitably be provided in the form of a coating on the outer wall of the capillary measuring tube. In this case a photoconducting material is chosen the specific dark resistance of which is equal to or larger then the specific electric resistance of the material of the wall. In the exposed condition the specific electric resistance of the photoconducting material should be of the same order or smaller than that of the material of the wall of the capillary measuring tube. In case of a small wall thickness, the specific resistance of the photoconducting material may be higher than in case of a greater wall thickness.

Selenium, for example, may be used as a photoconducting material (specific dark resistance $10^8$–$10^9$ ohm cm. specific resistance in exposed condition $10^5$–$10^7$ ohm cm.). Other photoconducting materials such as cadmium chalcogenides, for example, cadmium sulfide, or photoconducting and preferably transparent synthetic plastics, such as polyvinyl carbazoles are also suitable. Transparent (light-transmitting) photoconducting materials are generally preferred. The photoconducting material may be provided by known methods, in case of selenium, for example by means of vapor deposition, in case of a synthetic plastic material with the aid of a solution by which a lacquerlike coating is obtained after evaporation of the solvent.

The thickness of the photoconducting coating is preferably chosen to be not higher than 60 $\mu$m. for selenium, preferably 0.1–10 $\mu$m. The coating may be thicker, for a transparent photoconducting synthetic plastic material, but preferably not thicker than the wall of the capillary measuring tube which is provided with the coating.

In the embodiment of the photoconducting material coming into contact with the electrolyte in the capillary measuring tube, this material must be resistant to this electrolyte and must not exchange ions. In this form the wall of the capillary measuring tube may comprise photoconducting material, preferably phtoconducting material having a specific resistance of $10^6$–$10^{12}$ ohm cm. in the exposed condition. A suitable embodiment is particularly the one in which the wall of the capillary measuring tube comprises a preferably transparent photoconducting synthetic plastic material, for example, a polyvinyl carbazole. A photoconducting polyvinyl carbazole which is commercially available under the Trademark Luvican M170 is particularly suitable (specific dark resistance $10^{12}$–$10^{17}$ ohm cm. specific resistance $10^8$–$10^9$ ohm cm. in the exposed condition).

A transparent electrically conducting coating provided on the photoconducting material is particularly suitable as a means for electrically connecting the exposed part of the photoconducting material to the recorder. Such a coating may comprise, for example, gold or silver, or an electrically conducting metal oxide such as tin oxide or indium oxide. Coatings of these materials may be provided in a manner known per se, and, for example, by vapor deposition or sputtering (for metals) or deposition from the vapor phase by chemical reaction (for metal oxides).

A simple embodiment which has been found to be very suitable in practice is the one in which the photoconducting material is present in the form of an uninterrupted coating on the wall of, for example, glass of the capillary measuring tube, which coating is provided with an uninterrupted transparent electrically conducting coating. In this case, the photoconducting coating is exposed through the transparent electrically conducting coating and the electric connection between the exposed part of the photoconducting coating and the electrically conducting coating provided thereon. It is alternatively possible to choose an embodiment in which in the given case a for example wedgelike notch is made in the photoconducting coating and in which the exposure does not take place through the electrically conducting coating, but in which the photoconducting coating in the notch is directly exposed in such a manner that the exposed part of the photoconducting coating still forms a connecting element between the wall of the capillary measuring tube and the electrically conducting coating. In this embodiment a nontransparent, electrically conducting coating may be used. In the embodiments described in this paragraph, the beam of light is preferably converged by optical means in such a manner that a substantially punctiform image is obtained on the exterior of the wall of the capillary measuring tube. In this manner the effective measuring surface of the detection electrode is reduced, and the resolving power of the measuring system is increased.

The dimensions of the capillary measuring tube are adapted to the desired embodiment of the device and method. The internal diameter of the capillary measuring tube is mostly chosen to be between 0.1 and 1.0 mm., and preferably between 0.1 and 0.4 mm. The wall thickness is chosen to be not greater than 1 mm., suitable wall thicknesses are especially those ranging from 0.01 to 0.1 mm.

A narrow beam of light which, if desired, is obtained by optical means is used for the exposure of the photoconducting coating. The wavelength used is adapted to the spectral sensitivity of the photoconducting material. The dimensions of the light spot on the photoconducting coating also determine the resolving power of the measuring system. If the photoconducting coating is provided on a nonphotoconducting wall of the capillary measuring tube, the resolving power is also determined by the thickness of this wall, the thinner this wall, the greater the resolving power at a given dimensions of the beam of light. In fact, the wall causes a broadening of the effective measuring surface of the detection electrode.

In this connection an embodiment having a particularly high resolving power is now described. In this embodiment the wall of the capillary measuring tube comprises transparent, photoconducting material, and the light from the beam is concentrated by optical means on the inner wall of the capillary measuring tube. The measurement can be performed in this manner with the aid of a substantially punctiform electrode, so that the potential variation in the liquid in the capillary measuring tube can be determined with great accuracy. This embodiment provides the possibility of performing analyses with samples of small dimensions which not only widens the field of application, but also reduces the period during which an analysis can be performed. Especially in this embodiment a resolving power of the measuring system is obtained which is considerably higher than that in the known method in which detection is carried out with the aid of thermocouples secured to the wall of the capillary measuring tube.

An advantage of the method and device according to the invention is that voltages can be used which are lower than those in the known methods. In case of the lower voltages, the separation of the zones is sharper than in case of the higher voltages, because less thermal diffusion occurs. It is alternatively possible to apply first a higher voltage between cathode and anode so as to realize a separation into zones within a short period, and to apply subsequently a lower voltage so as to allow the system in the capillary measuring tube to gain its thermal balance, and then to perform the measurements.

After the zones have been separated the voltage between cathode and anode may be considerably increased for a very short period during measurement. This period may be chosen to be so short that is does not cause a disturbance of the fronts between the zones, while at the same time an increase of the measuring accuracy is obtained, because the measurements take place at greater potential differences.

The method and device according to the invention are satisfactorily suitable for use of differential measurements. This can be done with the aid of two detection electrodes, that is to say, by using two beams of light with which two slightly spaced separated parts of the photoconducting coating are exposed. These exposed parts will be connected to the recorder with the aid of separate means, for example, in the form of two separated, transparent electrically conducting coatings. It is alternatively possible to work with intermittent beams of light so that closely spaced parts of the photoconducting coating are alternatively exposed.

Unlike the known method in which the detection is based on the measurement of heat development in the different zones, a counterflow may be used in the method according to the invention such as is the case in the first mentioned known method. When using a counterflow, a comparatively short capillary measuring tube may suffice which has, inter alia, the advantage that the voltage between cathode and anode at the same field strength may be lower than when using a longer measuring tube.

In order that the invention may be readily carried into effect, a few embodiments thereof will now be described in detail, by way of example with reference to the accompanying diagrammatic drawings.

In FIG. 1, the reference numeral 1 denotes the wall 1 of a glass capillary measuring tube shown in a cross section (external diameter 0.7 mm., internal diameter 0.4 mm.) of a glass having a specific electric resistance of approximately $10^7$ ohm cm. A photoconducting coating of selenium 2 is provided on the wall of the measuring tube. An electrically conducting transparent coating 3 of gold is provided on the photoconducting coating. This gold coating is connected electrically to a recorder (not shown in the FIG.) The arrows 4 denote a narrow beam of light.

The exposed part of the photoconducting coating becomes conducting and electrical contact is established between the wall of the measuring tube and the electrically conducting coating. It may be stated that a measuring or detection electrode has been provided at the area of the beam of light. The beam of light may be given the shape of the ring of light, so that a circle at right angles to the longitudinal direction of the measuring tube is exposed. This manner of forming a measuring electrode implies that it can be displaced in a simple manner along the capillary measuring tube. For this purpose it is only necessary to displace the beam of light in the longitudinal direction of this tube. This has different advantages. In this manner the measuring electrode may be provided successively on different areas of the measuring tube. The measuring tube can be scanned, and thus measurements can be performed in a simple manner at different instants so as to ascertain whether the separation into zones is already complete. Thus, it is possible that the ultimate measurement can be performed as soon as the separation into zones has been completed. The process of the separation into zones may be continued so that already sufficient information is available in certain cases, before the process of separation is completed. This will, for example, be the case if it is to be determined whether the sample to be examined includes or does not include a certain substance.

The measuring electrode may be displaced without disturbing, even to the slightest extent, the process of separation into zones in the capillary measuring tube. Therefore it has no detrimental influence on the definition of the separation into zones.

The method and device according to the invention while using a capillary measuring tube according to FIG. 1 is eminently suitable for performing a large number of analyses (series analyses). The simple form of the capillary measuring tube makes it technically possible to use a separate measuring tube for each analysis. This does not have economic drawbacks either.

Figures 2, 2A:
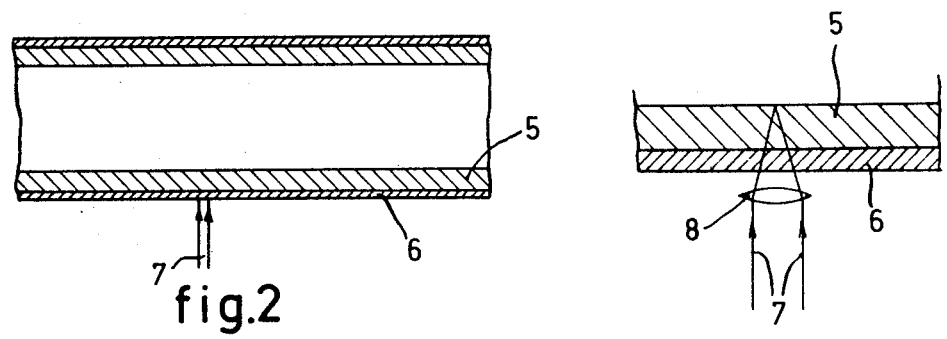

A further embodiment of a capillary measuring tube to be used for the method and device according to the invention is shown in a cross section in FIGS. 2 and 2a. In these FIGS., the reference numeral 5 denotes the wall of the capillary measuring tube, comprising a transparent photoconducting synthetic plastic material, for example, polyvinyl carbazole. The reference numeral 6 denotes a transparent electrically conducting coating of tin oxide, $SnO_2$, provided on this wall, which coating is electrically connected to a recorder (not shown in the FIGS.) The reference numeral 7 is a narrow beam of light which is converged with the aid of a system of lenses 8 (FIG. 2a) in such a manner that a substantially punctiform image is obtained on the inner side of the wall. The measuring electrode in this example has very small dimensions and is sharply defined, so that a great resolving power is obtained for the measuring system. When using a measuring tube formed from photoconducting material, as in this example, a considerably lower output impedance can be used for the recorder than when using a capillary measuring tube according to FIG. 1.

Figure 3:
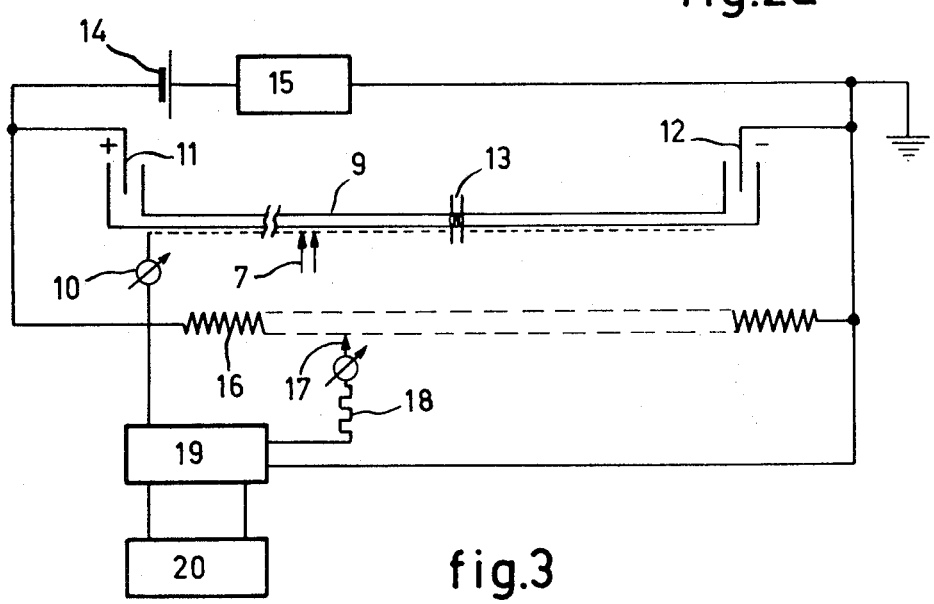

A device according to the invention is diagrammatically shown in FIG. 3 by way of example, and for further explanation of the invention. The device comprises a capillary measuring tube 9 according to FIG. 1. The measuring tube is connected to the anode container and the cathode container including the anode 11 and the cathode 12, respectively. The volume of the anode container and of the cathode container is very large as compared with that of the measuring tube. This serves to prevent the concentrations of anolyte and catolyte from varying considerably due to electrolysis possibly occurring at the electrodes. After the anode space is filled with anolyte (aqueous solution of 0.001 mole of NaCl which contains 2 percent by weight of hydroxy ethyl cellulose) and the cathode space is filled with catolyte (aqueous solution of 0.001 mole of $NaHCO_3$) and the measuring tube is filled with anolyte up to the four-way tap 13, the sample consisting of an aqueous solution of 0.001 mole of $NaMnO_4$ and 0.001 mole of $NaIrCl_6$ is introduced through the four-way tap into the measuring tube for performing the analysis. A voltage which is maintained constant during analysis with the aid of a voltage stabilizer 15 is applied between the electrode 11 and 12. The reference numeral 14 denotes the voltage source.

The dimensions of the glass measuring tube are as follows: Length 40 cm., external diameter 0.25 mm., internal diameter 0.22 mm. The flass has a specific resistance of $10^9$ ohm cm. A coating of photoconducting selenium (coating thickness approximately 0.2 $\mu$m.) was previously provided — by means of vapor deposition in a vacuum — on the wall of the measuring tube. A 300–500 A.-thick transparent, electrically conducting coating of gold, was provided on this coating likewise by means of vapor deposition in a vacuum. At the end of the measuring tube a coating of silver solder was provided on the gold coating. The coating of the silver solder is connected through a highly resistive measuring instrument 10 to amplifier 19 and recorder 20. The reference numeral 7 diagrammatically shows a beam of light which can be displaced along the capillary measuring tube (and which originating from a light source not shown) which is converged with the aid of a system of lenses in such a manner that a punctiform image is obtained on the outer side of the glass wall of the capillary measuring tube. In the FIG. a reference resistor 16 is incorporated in a potentiometer arrangement along which a sliding contact 17 can move which is connected through a highly resistive resistor 18 to the amplifier 19. When the light source and the said sliding contact are accurately adjusted and mechanically coupled, the difference between the potential variation existing in the capillary measuring tube and the potential variation across the reference resistor 16 can be measured. Thus, still a differential and hence very accurate measuring method is provided when using one detection electrode.

Figure 4A:
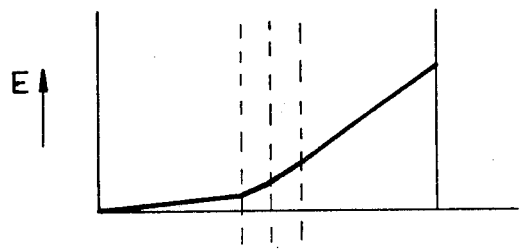
Figure 4B:
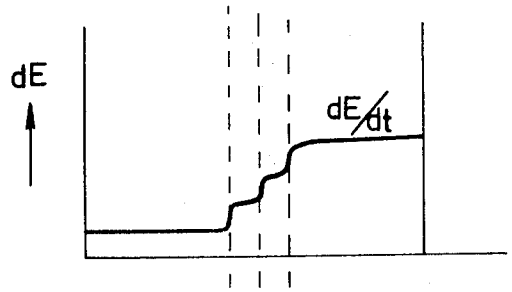
Figure 4C:
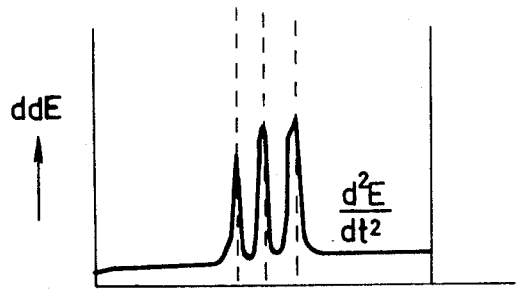

In the measurements of the said sample, the curve shown in FIG. 4a was recorded by the recorder which curve shows the variation of the potential E in the zones and the adjacent parts. FIG. 4b shows the differential coefficient plotted against the time of the curve of FIG. 4a, and FIG. 4c shows that of FIG. 4b. These differentiations have been brought about electronically.

What is claimed is:

1. A device for separating and analyzing mixtures of substances by means of displacement electrophoresis, comprising a cathode container including a cathode, and an anode container including an anode, connected by a capillary measuring tube, means for introducing a liquid sample to be analyzed into the capillary measuring tube, means for detecting potentials (potential gradients) in the longitudinal direction of the capillary measuring tube, characterized in that a detection electrode provided on or in the capillary measuring tube is formed by a photoconducting material, that means are provided to expose the photoconducting material in the area or areas of the capillary measuring tube where the potential shall be measured, that means are provided to electrically connect the exposed part of the photoconducting material which has become electrically conducting to an electric measuring device.

2. A device as claimed in claim 1, characterized in that the wall of the capillary measuring tube comprises a nonphotoconducting material having a specific electric resistance of $10^6$–$10^{12}$ ohm cm.

3. A device as claimed in claim 2, characterized in that the photoconducting material is provided in the form of a coating on the outer side of the capillary measuring tube 4. A device as claimed in claim 3, characterized in that a coating of a transparent, electrically conducting material is provided on the coating comprising photoconducting material.

5. A device as claimed in claim 2, characterized in that the photoconducting material comprises selenium.

6. A device as claimed in claim 2, characterized in that the photoconducting material comprises a cadmium chalcogenide.

7. A device as claimed in claim 2, characterized in that the photoconducting material comprises a photoconducting synthetic plastic material.

8. A device as claimed in claim 7, characterized in that the photoconducting synthetic plastic material is a polyvinyl carbazole.

9. A device as claimed in claim 1, characterized in that it comprises means to throw a beam of light onto the photoconducting material, the diameter of said beam being smaller than or equal to the thickness of the wall of the capillary measuring tube.

10. A device as claimed in claim 9, characterized in that it comprises optical means to converge the beam of light used during measurement in such a manner that a substantially punctiform image is obtained on the outer side of the wall of the capillary measuring tube.

11. A device as claimed in claim 1, characterized in that the wall of the capillary measuring tube comprises photoconducting material having a specific resistance of $10^6$–$10^{12}$ ohm cm. in the exposed condition.

12. A device as claimed in claim 11, characterized in that a coating of a transparent, electrically conducting material is provided on the wall of the capillary measuring tube.

13. A device as claimed in claim 11, characterized in that the wall of the capillary measuring tube comprises a photoconducting synthetic plastic material.

14. A device as claimed in claim 13, characterized in that a polyvinyl carbazole is used as a photoconducting synthetic plastic material.

15. A device as claimed in claim 11, characterized in that it comprises optical means to converge the beam of light used during measurement in such a manner that a substantially punctiform image is obtained on the inner side of the wall of the capillary measuring tube.

* * * * *